United States Patent
Dria et al.

(10) Patent No.: US 7,833,561 B2
(45) Date of Patent: Nov. 16, 2010

(54) LIQUID COFFEE CONCENTRATES

(75) Inventors: Glenn James Dria, Okeana, OH (US); Jerry Douglas Young, Cincinnati, OH (US); Raul Victorino Nunes, Loveland, OH (US); Jianjun Justin Li, West Chester, OH (US); Donald Ray Patton, Cincinnati, OH (US)

(73) Assignee: The Folgers Coffee Company, Cincinnati, OH (US)

( * ) Notice: Subject to any disclaimer, the term of this patent is extended or adjusted under 35 U.S.C. 154(b) by 867 days.

(21) Appl. No.: 11/048,202

(22) Filed: Feb. 1, 2005

(65) Prior Publication Data

US 2005/0129828 A1 Jun. 16, 2005

Related U.S. Application Data

(62) Division of application No. 10/272,968, filed on Oct. 17, 2002, now abandoned.

(60) Provisional application No. 60/345,234, filed on Oct. 19, 2001.

(51) Int. Cl.
*A23F 5/00* (2006.01)
(52) U.S. Cl. .................. 426/594; 426/432; 426/520; 426/330.3
(58) Field of Classification Search .............. 426/594, 426/432, 520, 330.3
See application file for complete search history.

(56) References Cited

U.S. PATENT DOCUMENTS

| | | | |
|---|---|---|---|
| 2,098,961 A | 11/1937 | Fronmuller | |
| 2,149,876 A | 3/1939 | Wendt et al. | |
| 2,360,342 A * | 10/1944 | Heyman | 426/594 |
| 2,457,036 A * | 12/1948 | Epstein | 426/331 |
| 2,515,730 A * | 7/1950 | Ornfelt | 426/434 |
| 3,089,772 A | 5/1963 | Bowden et al. | |
| 3,554,761 A | 1/1971 | Carbonell | |
| 3,620,758 A | 11/1971 | Friedman et al. | |
| 3,628,345 A | 12/1971 | King | |
| 3,632,353 A | 1/1972 | Reimus et al. | |
| 3,702,253 A | 11/1972 | Winter et al. | |
| 3,717,472 A | 2/1973 | Strobel | |
| 3,830,940 A | 8/1974 | Sivetz | |
| 3,900,582 A | 8/1975 | Winter et al. | |
| 3,928,636 A | 12/1975 | Katz | |
| 3,947,603 A | 3/1976 | Winter et al. | |
| 3,997,685 A | 12/1976 | Strobel | |
| 4,000,328 A | 12/1976 | Winter et al. | |
| 4,005,227 A | 1/1977 | Winter et al. | |
| 4,088,794 A | 5/1978 | Katz et al. | |
| 4,158,067 A | 6/1979 | Wouda | |
| 4,303,689 A | 12/1981 | Winter et al. | |
| 4,334,640 A | 6/1982 | Van Overbruggen et al. | |
| 4,349,573 A | 9/1982 | Stefanucci et al. | |
| 4,378,380 A | 3/1983 | Scarpellino et al. | |
| 4,481,224 A | 11/1984 | Muralidhara et al. | |
| 4,571,339 A | 2/1986 | Katz et al. | |
| 4,571,343 A | 2/1986 | Pittet et al. | |
| 4,606,921 A | 8/1986 | Liu | |
| 4,618,500 A | 10/1986 | Forquer | |
| 4,652,682 A | 3/1987 | Pittet et al. | |
| 4,673,580 A | 6/1987 | Matsuda et al. | |
| 4,746,527 A | 5/1988 | Kuypers | |
| 4,748,040 A | 5/1988 | Kuypers | |
| 4,789,553 A | 12/1988 | McIntyre et al. | |
| 4,794,010 A | 12/1988 | Jones et al. | |
| 4,857,351 A | 8/1989 | Neilson et al. | |
| 4,938,978 A | 7/1990 | Husaini | |
| 4,980,182 A | 12/1990 | Kwon et al. | |
| 4,985,271 A | 1/1991 | Neilson et al. | |
| 4,988,590 A | 1/1991 | Price et al. | |
| 5,079,026 A | 1/1992 | Arora et al. | |
| 5,089,279 A | 2/1992 | Van Rooijen | |
| 5,132,135 A | 7/1992 | Schweinfurth | |
| 5,225,223 A | 7/1993 | Vitzthum et al. | |
| 5,332,591 A | 7/1994 | Ogden | |
| 5,380,540 A | 1/1995 | Yamanaka et al. | |
| 5,478,592 A | 12/1995 | Kingsley et al. | |
| 5,620,733 A | 4/1997 | Chaveron et al. | |
| 5,637,343 A | 6/1997 | Ryan, Jr. | |
| 5,688,545 A | 11/1997 | Sanders | |

(Continued)

FOREIGN PATENT DOCUMENTS

CA   1 182 328   2/1985

(Continued)

OTHER PUBLICATIONS

"Extracting a Natural Coffee Flavour"—Food Processing, May 1989, p. 15.

(Continued)

*Primary Examiner*—Anthony Weier
(74) *Attorney, Agent, or Firm*—Calfee, Halter & Griswold LLP

(57) ABSTRACT

Improved liquid coffee concentrates that have furfuryl acetate to 4-ethyl guaiacol ratio values that approach the furfuryl acetate to 4-ethyl guaiacol ratio values of fresh brewed coffees brewed with the same coffees used to produce said coffee concentrates are shown. Methods of evaluating and adjusting a liquid coffee concentrate's furfuryl acetate to 4-ethyl guaiacol ratio value are also shown.

28 Claims, No Drawings

U.S. PATENT DOCUMENTS

| | | | |
|---|---|---|---|
| 5,824,357 | A | 10/1998 | Chaveron et al. |
| 5,922,384 | A | 7/1999 | Blackwell et al. |
| 5,958,497 | A | 9/1999 | Grimm et al. |
| 5,972,409 | A | 10/1999 | Liu et al. |
| 5,993,877 | A | 11/1999 | Ohtake |
| 6,054,162 | A | 4/2000 | Bradbury et al. |
| 6,056,989 | A | 5/2000 | Sasagawa et al. |
| 6,093,436 | A | 7/2000 | Zheng et al. |
| 6,120,831 | A | 9/2000 | Zeller et al. |
| 6,165,536 | A | 12/2000 | Heeb et al. |
| 6,203,837 | B1 | 3/2001 | Kalenian |
| 6,231,907 | B1 | 5/2001 | Kino et al. |
| 6,399,136 | B1 | 6/2002 | Watkins, Jr. et al. |
| 6,576,283 | B2 * | 6/2003 | Hashimoto et al. ........... 426/584 |
| 6,602,538 | B1 * | 8/2003 | Watkins, Jr. et al. ........ 426/594 |
| 6,808,731 | B1 | 10/2004 | Gutwein et al. |
| 2001/0000145 | A1 | 4/2001 | Kalenian |

FOREIGN PATENT DOCUMENTS

| | | |
|---|---|---|
| CA | 2379289 | 2/2001 |
| CA | 2 317 799 | 3/2001 |
| EP | 0 159 754 | 10/1985 |
| EP | 0 189 442 B1 | 8/1986 |
| EP | 0 242 493 B1 | 10/1987 |
| EP | 0 343 678 A2 | 11/1989 |
| EP | 0 347 832 B1 | 12/1989 |
| EP | 0 472 358 B1 | 1/1996 |
| EP | 0 865 735 A1 | 9/1998 |
| EP | 1 059 243 A2 | 12/2000 |
| JP | 57-050844 | 3/1982 |
| JP | 57-050845 | 3/1982 |
| JP | 57-163438 | 10/1982 |
| JP | 61-199776 | 3/1985 |
| JP | 61-35747 | 2/1986 |
| JP | 61-021056 | 5/1986 |
| JP | 62-126935 | 6/1987 |
| JP | 01-104130 | 4/1989 |
| JP | 01-289450 | 11/1989 |
| JP | 4-211332 | 8/1992 |
| JP | 7-087891 | 4/1995 |
| JP | 11-225673 | 8/1999 |
| JP | 2000-201622 | 7/2000 |
| JP | 2001-158(A) | 1/2001 |
| JP | 2001-54374 | 2/2001 |
| JP | 2001-128620 | 5/2001 |
| WO | WO 97/16073 | 5/1997 |
| WO | WO 98/07328 | 2/1998 |
| WO | WO 99/25879 | 5/1999 |
| WO | WO 00/04789 | 2/2000 |
| WO | WO 00/38540 | 7/2000 |
| WO | WO 00/42831 | 7/2000 |
| WO | WO 00/69274 | 11/2000 |
| WO | 01/11981 | 2/2001 |
| WO | WO 01/43566 A1 | 6/2001 |
| WO | WO 01/50885 A2 | 7/2001 |

OTHER PUBLICATIONS

"Flavors for Aseptic Milk Withstand UHT"—Food Development / Oct. '81, p. 25.

Nash, P., et al.—"Developing a New Coffee Flavoured Milk Drink"—Farm & Food Research, vol. 16, No. 5, Bimonthly, Oct. 1985, p. 158.

Kumazawa, Kenji, et al.—"Change in Flavor of Coffee Drink During Heating"—Nippon Shokuhin Kagaku Kaishi, vol. 45, No. 2, pp. 108-113 (1998) (Report)—Material Research Institute, Owawa Koryo Co., Ltd.

Baltussen, E., et al. —"Stir Bar Sorptive Extraction (SBSE), a Novel Extraction Technique for Aqueous Samples: Theory and Principles", J. Microcolumn Seperations, 11(10), 737-747, 1999.

"The Story of Coffee—Reading This Book Makes You a Connoisseur of Coffee" Hagihara Coffee Co., Ltd., Nov. 1, 1984, p. 79.

International Search Report dated Feb. 4, 2003, for International Application No. PCT/US02/33476.

International Preliminary Examination Report dated Dec. 5, 2003, for International Application No. PCT/US02/33476.

Office Action dated Apr. 28, 2008, for related Canadian Patent Application No. 2,459,389.

Office Action dated Aug. 19, 2008, for related Japanese Patent Application No. 2003-535556.

Non-Final Office Action dated Aug. 20, 2004, for related U.S. Appl. No. 10/272,968.

Response to Non-Final Office Action submitted to the U.S. Patent Office on Sep. 13, 2004, in response to the Non-Final Office Action mailed Aug. 20, 2004, for U.S. Appl. No. 10/272,968.

Non-Final Office Action dated Dec. 22, 2004, for related U.S. Appl. No. 10/272,968.

Response to Non-Final Office Action submitted to the U.S. Patent Office on Feb. 1, 2005, in response to the Non-Final Office Action mailed Dec. 22, 2004, for U.S. Appl. No. 10/272,968.

Non-Final Office Action dated May 19, 2005, for related U.S. Appl. No. 10/272,968.

Response to Non-Final Office Action submitted to the U.S. Patent Office on Aug. 19, 2005, in response to the Non-Final Office Action mailed May 19, 2005, for U.S. Appl. No. 10/272,968.

Final Office Action dated Nov. 9, 2005, for related U.S. Appl. No. 10/272,968.

RCE and Amedment submitted to the U.S. Patent Office on Feb. 9, 2006, in response to the Final Office Action mailed Nov. 9, 2005, for U.S. Appl. No. 10/272,968.

Non-Final Office Action dated Mar. 30, 2006, for related U.S. Appl. No. 10/272,968.

Response to Non-Final Office Action submitted to the U.S. Patent Office on Aug. 25, 2006, in response to the Non-Final Office Action mailed Mar. 30, 2006, for U.S. Appl. No. 10/272,968.

Final Office Action dated Dec. 27, 2006, for related U.S. Appl. No. 10/272,968.

Notice of Abandonment dated Jul. 24, 2007, for related U.S. Appl. No. 10/272,968.

RCE and Amendment submitted to the U.S. Patent Office on Apr. 24, 2007, in response to the Final Office Action mailed Dec. 27, 2006, for U.S. Appl. No. 10/272,968.

Petition to Withdraw Holding of Abandonment submitted to the U.S. Patent Office on Sep. 24, 2007, in response to the Notice of Abandonment mailed Jul. 24, 2007, for U.S. Appl. No. 10/272,968.

Decision on Petition dated Oct. 12, 2007, for related U.S. Appl. No. 10/272,968.

Non-Final Office Action dated Nov. 1, 2007, for related U.S. Appl. No. 10/272,968.

Response to the Non-Final Office Action submitted to the U.S. Patent Office on Feb. 1, 2008, in response to the Non-Final Office Action mailed Nov. 1, 2007, for U.S. Appl. No 10/272,968.

Final Office Action dated Apr. 25, 2008, for related U.S. Appl. No. 10/272,968.

Interview Summary dated Sep. 11, 2008, for related U.S. Appl. No. 10/272,968.

RCE and Amendment submitted to the U.S. Patent Office on Sep. 23, 2008, in response to the Final Office Action mailed Apr. 25, 2008, for U.S. Appl. No. 10/272,968.

Non-Final Office Action dated Sep. 30, 2008, for related U.S. Appl. No. 10/272,968.

Office action from Canadian application No. 2,459,389 dated Oct. 20, 2009.

* cited by examiner

LIQUID COFFEE CONCENTRATES

CROSS REFERENCE TO RELATED APPLICATIONS

The present is a Divisional Application of U.S. application Ser. No. 10/272,968, filed Oct. 17, 2002, now abandoned which claims the benefit of priority to U.S. Provisional Application Ser. No. 60/345,234, filed Oct. 19, 2001, both of which are herein incorporated by reference.

TECHNICAL FIELD

The present invention relates to liquid coffee concentrates, methods of producing and assessing the quality of liquid coffee concentrates and products containing said concentrates.

BACKGROUND OF THE INVENTION

Consumers produce the traditional "pot of coffee" by extracting the desired components of roast and ground coffee using an automatic drip coffee maker (ADC) or other form of brewer. Although the flavor and aroma of such a coffee beverage is highly desired and appreciated, the inconvenience of the brewing process has lead to the development of instant coffee and coffee concentrate products that allow the consumer to quickly make a single cup of coffee. Unfortunately, the production processes used to produce such coffee products result in finished products having ratios of flavor and aroma components that are different from fresh brewed coffee. As a result, coffee beverages produced from such concentrated products do not have the highly desired flavor and aroma of fresh brewed coffee.

Since the flavor and aroma of fresh brewed coffee is especially desired by consumers, attempts have been made to improve the flavor and aroma of products made from coffee concentrates. Such attempts include incorporating volatile aroma flavor components into the finished concentrates, and the intensification of such components by the application of thermal energy. While such attempts are appreciated, there remains a need for a liquid coffee concentrate having the same ratios of flavor and aroma components as that of fresh brewed coffee brewed from the same coffee used to produce the coffee concentrate.

SUMMARY OF THE INVENTION

Applicant's invention relates to a liquid coffee concentrate having a furfuryl acetate to 4-ethyl guaiacol ratio value that is from about 50% to about 210% of the furfuryl acetate to 4-ethyl guaiacol ratio value of fresh brewed coffee brewed with the same coffee used to produce said coffee concentrate. Applicants also claim methods of producing and assessing the quality of coffee concentrates and products containing said concentrates.

DETAILED DESCRIPTION

A. Definitions

As used herein, the term "coffee product" includes, but is not limited to coffee concentrates, coffee extracts and fresh brewed coffee.

As used herein, the term "coffee concentrate" means a coffee extract that has undergone additional processing, such as thermal treatment.

As used herein, the term "pyridine to 5-methyl-2-furfurylfuran ratio value" refers to the number that is obtained when a coffee product's pyridine and 5-methyl-2-furfurylfuran peak area values are determined according to Applicants' analytical test and said resulting pyridine's peak area value is divided by said 5-methyl-2-furfurylfuran's peak area value.

As used herein, the term "furfuryl acetate to 4-ethyl guaiacol ratio value" refers to the number that is obtained when a coffee product's furfuryl acetate and 4-ethyl guaiacol peak area values are determined according to Applicants' analytical test and said resulting furfuryl acetate's peak area value is divided by said 4-ethyl guaiacol's peak area value.

As used herein, the term "unit operation" includes, but is not limited to, equipment used to transfer heat such as heaters and coolers; holders; and transfer lines.

All percentages and ratios are calculated by weight unless otherwise indicated.

As used herein, the articles a and an, when used in a claim, are understood to mean at least one of the components that are claimed or described.

Publications, patents, and patent applications are referred to throughout this disclosure. All references cited herein are hereby incorporated by reference in their entirety.

B. Coffee Concentrate Characteristics and Preparation

The quality of any ready-to-use coffee product, made from a coffee concentrate, is dependent on the properties of the concentrate. Although coffee concentrates contain innumerable aroma and flavor components, Applicants discovered that the flavor and aroma of products made from concentrate approaches that of fresh brewed coffee when the concentrate's ratio value of furfuryl acetate to 4-ethyl guaiacol approaches the furfuryl acetate to 4-ethyl guaiacol ratio value of fresh brewed coffee brewed from the same coffee used to produce the concentrate.

In addition to discovering the correlation between the ratio value of furfuryl acetate to 4-ethyl guaiacol, and flavor and aroma, Applicants discovered that a coffee concentrate's ratio of furfuryl acetate to 4-ethyl guaiacol can be adjusted by the application of thermal energy to the concentrate. While evaluating the suitability of thermal processing, Applicants discovered that the entire, rather than just the hold tube portion, of a time and temperature profile must be considered. Applicants also recognized that the suitability of any set of thermal processing conditions is not only time and magnitude dependent but rate dependent as well. As a result, more common thermal processing descriptors such as Fo are insufficient to describe the thermal processing conditions that will result in the flavor and aroma improvements of Applicants' invention. Thus, Applicants' processing conditions are described in terms of equivalent times and temperatures, as thermal processing conditions that are time, magnitude and rate dependent can be effectively and efficiently described by these descriptors.

A detailed description of Applicants' coffee concentrate and processes of making said concentrate is set forth in detail below.

1. Coffee Concentrate

Embodiments of Applicants' coffee concentrate have a ratio value of furfuryl acetate to 4-ethyl guaiacol that is from about 50% to about 210% of the ratio value of furfuryl acetate to 4-ethyl guaiacol of fresh brewed coffee brewed with the same coffee used to produce said coffee concentrate. Other embodiments of Applicants' coffee concentrate have a ratio value of furfuryl acetate to 4-ethyl guaiacol that is from about 65% to about 150% of the ratio value of furfuryl acetate to 4-ethyl guaiacol of fresh brewed coffee brewed with the same coffee used to produce said coffee concentrate. Still other embodiments of Applicants' coffee concentrate have a ratio value of furfuryl acetate to 4-ethyl guaiacol that is from about 80% to about 120% of the ratio value of furfuryl acetate to 4-ethyl guaiacol of fresh brewed coffee brewed with the same coffee used to produce said coffee concentrate.

2. Process of Making Coffee Concentrate

Coffee extracts that can be thermally processed according to Applicants' process can be prepared by any suitable process used to produce a coffee extract. Preferably, said coffee extracts are non-hydrolysed liquids having pyridine to 5-methyl-2-furfurylfuran ratio values of from about 3:1 to about 25:1 and solids contents of from about 2.3% to about 25% by weight. Other preferred non-hydrolysed liquid coffee extracts include those extracts having a pyridine to 5-methyl-2-furfurylfuran ratio value of from about 4:1 to about 20:1 and a solids content of from about 3.5% to about 10% by weight; and those extracts having a pyridine to 5-methyl-2-furfurylfuran ratio value of from about 4.5:1 to about 15:1 and a solids content of from about 3.5% to about 8% by weight.

Suitable methods of producing a coffee extract include, but are not limited to, extracting said concentrate from roasted and ground, caffeinated or decaffeinated coffee using a continuous flow column. Said columns are typically stainless steel vertical columns having a height-to-diameter ratio greater than or equal to 6:1 and a perforated top and bottom retainer to permit the transport of feed water while simultaneously keeping coffee granules between the retainers. Suitable columns can be obtained from Niro A/S of Soeborg, Denmark.

Suitable extraction conditions include, but are not limited to, operating the extraction process at a temperature less than 149° C. and achieving a flow rate ratio of kilograms water per minute to kilograms of coffee from about 0.1:1 to about 0.5:1, a water front speed of from about 5 cm to about 25 cm per minute, a draw-off ratio of mass of extract to mass of coffee from about 4:1 to about 10:1; and a yield of from about 17% to about 35%. Other suitable extraction conditions include operating the extraction process at a temperature less than 149° C. and achieving a flow rate ratio of kilograms water per minute to kilograms of coffee from about 0.2:1 to about 0.4:1, a water front speed of from about 12.5 cm to about 25 cm per minute, a draw-off ratio of mass of extract to mass of coffee from about 5.5:1 to about 8:1; and a yield of from about 17% to about 30%; and operating the extraction process at a temperature less than 149° C. and achieving a flow rate ratio of kilograms water per minute to kilograms of coffee from about 0.25:1 to about 0.36:1, a water front speed of from about 12.5 cm to about 15.2 cm per minute, a draw-off ratio of mass of extract to mass of coffee from about 6.5:1 to about 7:1; and a yield of from about 23% to about 27.5%. Still other suitable extraction conditions include operating the extraction process at a temperature range of from about 65° C. to about 99° C. or from about 82° C. to about 93° C. and achieving any set of flow rate, water front speed, draw-off ratio and yield parameters detailed previously.

After a suitable extract is obtained, said extract is thermally processed. Suitable thermal processing equipment includes but is not limited to, a MicroThermics model 25DH UHT/HTST unit. Said equipment can be obtained from MicroThermics Inc. Raleigh, N.C. U.S.A. Regardless of the thermal processing equipment that is employed to thermally process a coffee extract, said equipment must be operated such that the extract is heat treated for an equivalent time from about 15 seconds to about 35 seconds at an equivalent temperature of from about 115° C. to about 149° C.; preferably said equipment must be operated such that the extract is heat treated for an equivalent time from about 16.5 seconds to about 30 seconds at an equivalent temperature of from about 126° C. to about 149° C.; and most preferably said equipment must be operated such that the extract is heat treated for an equivalent time from about 18 seconds to about 28 seconds at an equivalent temperature of from about 137° C. to about 149° C. Additionally, when an extract is heat treated for an equivalent time and temperature combination such that the following mathematical relationship is true, the resulting concentrate is sufficiently sterile to be aseptically packaged.

$$\text{Log(Equivalent Time)} \geq \log(10.1) - \frac{(\text{Equivalent Temperature} - 135° \text{ C.})}{10.5}$$

The resultant coffee concentrate used may be used immediately, in the same manner as conventional coffee concentrates, to form coffee containing products or may be packaged according to known methods for later use.

Analytical Methods

1. Method For Calculating Equivalent Time and Temperature
   a.) Obtain time and temperature data for the thermal process of interest. This data must include at least 10 (time, temperature) data points for each unit operation that is part of said thermal process.
   b.) Interpolate the time and temperature data obtained in Step (a) above using the Cubic Spline Interpolation Method found on pages 143 to 150 of *Numerical Analysis*, by Richard L. Burden, J. Douglas Faires, Sixth Edition, 1997 Brooks/Cole Publishing Company, ISBN 0-534-95532-0 to obtain a time/temperature profile.
   c.) Evaluate $G_{Total}$ using the following equation and numerical integration according to the Romberg Method found on pages 209 to 213 of *Numerical Analysis*, Richard L. Burden, J. Douglas Faires, Sixth Edition, 1997 Brooks/Cole Publishing Company, ISBN 0-534-95532-0:

$$G_{Total_j} := \int_0^{time_{final}} \exp\left[\frac{-1 \cdot Ea_j \cdot 1000}{R \cdot (T_{emp}(t) + 273.15)}\right] dt$$

for the following activation energies (Arrhenius model):
   Ea=(50, 70, 90, 110, 130, 150, 170, 190, 210, 230, 250, 270, 290, 310, 330)
   Where said activation energies are expressed in kJ/mol, R=8.314 J/mol. K, time is expressed in seconds and temperature is expressed in ° C.
   d.) Using the equation below:

$$\log(G_{Total}) = \log(t_E) - \frac{1000}{R \cdot \ln(10) \cdot T_E} \cdot Ea$$

transform the ($G_{Total}$, Ea) data points into a linear equation, and then use linear regression such that:

$$\text{Equivalent\_Time} := 10^{intercept(Ea\ log(G_{Total}))}$$

$$\text{Equivalent\_Temperature} := \frac{-1000}{R \cdot \ln(10) \cdot slope(Ea, \log(G_{Total}))} - 273.15$$

where the Equivalent Time is expressed in seconds and the Equivalent Temperature in ° C.

2. Method of Determining The Percent Solids of Fresh Brewed Coffee, Coffee Extracts and Coffee Concentrates (Analysis Must be Done in Triplicate).
  a.) Weigh a clean, empty vessel to the nearest 0.0001 gram.
  b.) Place 25 ml of test sample in the vessel.
  c.) Weigh the vessel containing the sample to the nearest 0.0001 gram.
  d.) Place the vessel in a convection oven at 105° C. and dry to a constant weight.
  e.) Remove the vessel from the oven and then weigh the vessel to the nearest 0.0001 gram.
  f.) Calculate % solids by weight as follows:

$$\% \text{ Solids} = \left[ \frac{(DrySampleWeight + VesselWeight) - VesselWeight}{(InitialSampleWeight + VesselWeight) - VesselWeight} \right] \times 100$$

3. Method of PreDaring Fresh Brewed Coffee For Use In Analytical Method No. 5 below.

Fresh brewed coffee is made using the same coffee used to produce the coffee concentrate of interest.
  a.) Materials and Apparatus:
    i.) 33.3 g of the roast and ground coffee having an average particle size of 600 to 850 microns.
    ii.) 1420 mls of distilled water.
    iii.) Mr. Coffee® model Accel™ automatic drip coffee brewer.
    iv.) Mr. Coffee® Model # UF100 coffee filter.
  b.) Brewing Procedure
    i.) Place the coffee in a filter and then place the filter in the brewer.
    ii.) Pour the distilled water into the coffee brewer and then brew according to the Mr. Coffee® brewing directions.
    iii.) After completing Step (b)(ii), separate the brewed coffee into 2 aliquots. Immediately freeze one aliquot, and use the second aliquot to determine, according to Method No. 2 above, the % solids, by weight, of the coffee.
    iv) Prior to testing according to Method No. 5 below, thaw the frozen sample and dilute said sample to a concentration of 0.55% solids by weight. After thawing and diluting the sample, the sample must be analyzed according to Method No. 5 below within 30 minutes.

4. Method of Preparing Coffee Extracts And Concentrates For Use In Analytical Method No. 5 below.
  a.) Within 30 minutes after an extract or concentrate is produced, two aliquots of the extract or concentrate must be obtained. One aliquot is immediately packaged in a glass container that is then sealed and frozen. The % solids, by weight, of the second aliquot is immediately determined according to Method No. 2 above.
  b.) Prior to testing according to Method No. 5 below, thaw the frozen sample and dilute said sample to a concentration of 0.55% solids by weight. After thawing and diluting the sample, the sample must be analyzed according to Method No. 5 below within 30 minutes.

5. Method For Determining Furfuryl Acetate:4-ethyl Guaiacol Ratio Values And Pyridine:5-Methyl-2-Furfuryffuran Ratio Values (Analysis must be done in triplicate).

Apparatus:
1. 100 ml headspace sampling vial cleaned with distilled water and heated in a muffle furnace at 500° C. for 24 hours.
2. Thermostated container capable of being thermostated to at least 5° C.
3. Digital magnetic stirrer capable of a stirring speed of at least 300 rpm.
4. A clean 1 cm Twister™ bar having a coating thickness of 0.5 mm (stir bar coated with polydimethylsiloxane) supplied by the Gerstel GmbH & Co. KG of Mülheim an der Ruhr, Germany.
5. A clean modified trap consisting of a 1-ml syringe barrel with a threaded glass tip packed with deactivated glass wool as described on page 204 of S. Maeno and P. A. Rodriguez, "Simple and versatile injection system for capillary gas chromatographic columns performance evaluation of a system including mass spectrometric and light-pipe Fourier-transform infrared detection", J. Chromatogr. A 1996, 731, 201-215.
6. Gas Chromatograph (GC): Hewlett Packard (HP) model 6890: the GC is modified to accommodate the trap of (5) above as described on page 203 of S. Maeno and P. A. Rodriguez, "Simple and versatile injection system for capillary gas chromatographic columns performance evaluation of a system including mass spectrometric and light-pipe Fourier-transform infrared detection", J. Chromatogr. A 1996, 731, 201-215.
7. GC column: Durabond-5® Mass Spectrometer (30 meters in length, 0.252 mm column ID and 1.0 µm film thickness) obtained from J&W Scientific of Folsom, Calif., USA.
8. Carrier gas, helium, capable of being delivered at a 2 ml/min. flow rate.
9. Model HP 5973 Mass Selective Detector obtained from Hewlett Packard, Santa Clarita, Calif., USA having a source temperature of about 230° C., and a MS Quad temperature of about 150° C.
10. Chemstation software obtained from Hewlett Packard, Santa Clarita, Calif., USA and computer capable of running said software.
11. MS spectral libraries of John Wiley & Sons and the National Institute of Standards and Technology (NIST), purchased and licensed through Hewlett Packard.

Procedure:
1. Thermostat the container (Apparatus # 2) to 5° C.
2. Add 50 mls of the sample solution (prepared according to Methods 3 or 4 above) into the 100 ml headspace vial.
3. Add 50 µls of an internal standard solution (2-heptanone, 500 ppm in water) to the 100 ml headspace vial.
4. Place the Twister™ bar into the 100 ml headspace vial and seal the vial with a crimp seal.
5. Place the 100 ml headspace vial from Step (4) above into the thermostated container
6. Place the thermostated container containing the 100 ml headspace vial on to the digital magnetic stirrer and stir at 300 rpm for 45 minutes.

7. After Step (6) above is completed, remove the Twister™ bar from the 100 ml sample vial and rinse the bar with 4 mls of chilled (5° C.) Milli-Q™ water, and then blott the bar dry with Kimwipes™.
8. After Step (7) above is completed place the Twister™ bar into the trap (Apparatus 5).
9. Start sequence of sample loading and analysis.
    i) cool the pre-column to a temperature equal to or less than −90° C.
    ii) next, connect the trap to a helium flow having a flow rate of 15 ml/min
    iii) then heat the trap to 200° C. for 8 minutes to desorb the trapped flavor compounds.
10. After Step (9) is complete, the GC-MS analysis is run as follows. The following temperature program is used:
    i) an initial temperature of 50° C. which is held for 1 minute,
    ii) increase the initial temperature at a rate of 4° C./min until a temperature of 250° C. is reached,
    iii) hold at 250° C. for 1 minute.
11. Identify the peaks corresponding to furfuryl acetate, 4-ethyl guaiacol, pyridine and 5-methyl-2-furfurylfuran using the MS spectral libraries of John Wiley & Sons and the National Institute of Standards and Technology (NIST), purchased and licensed through Hewlett Packard.
12. Integrate the chromatographic peaks corresponding to the ions (listed below) for each identified compound using the Chemstation software obtained from Hewlett Packard, Santa Clarita, Calif., USA.
    i.) Pyridine (PYR) ion having a mass to charge ratio of 52
    ii.) Furfuryl Acetate (FA) ion having a mass to charge ratio of 140
    iii.) 5-Methyl-2-Furfurylfuran (5MFF) ion having a mass to charge ratio of 162
    iv.) 4-Ethyl Guaiacol (EG) ion having a mass to charge ratio of 137
13. For a test sample obtain the ratio values of furfuryl acetate to 4-ethyl guaiacol and pyridine to 5-methyl-2-furfurylfuran as follows:
    i) ratio value of FA:EG=peak area FA ion/peak area EG ion
    ii) ratio value of PYR:5MFF=peak area PYR ion/peak area 5MFF ion

REFERENCES

1. E. Baltussen, P. Sandra, F. David and C. Cramers, "Stir Bar Sorptive Extraction (SBSE), a Novel Extraction Technique for Aqueous Samples: Theory and Principles", J. Microcolumn Separations, 11(10), 737-747, 1999.

6. Color Measurement (Analysis must be Done in Triplicate).
    a.) Apparatus
        i) Hunter D25L-9000 calorimeter with a DP9000 processor supplied by Hunter Associates Laboratory Inc. of Reston, Va. U.S.A.
        ii) Straight edge
        iii) Aluminum sample cup 2.5 cm high and having an outside diameter of 12.4 cm. The cup contains a cavity having a depth of 1.9 cm and an inside diameter of 11.8 cm.
    b.) Procedure
        i) Place a sufficient amount of coffee, having an average particle size of 600 to 850 microns, in the sample cup to overfill the sample cup.
        ii) Level the coffee in the sample cup, using the straight edge, such that the coffee sample is uniformly even with the top of the cup.
        iii) Place the cup in the Hunter D25L-9000 colorimeter and operate the instrument according to the manufacturer's instructions.
        iv) Record the L color value.

EXAMPLES

The following examples are illustrative of the present invention but are not meant to be limiting thereof.

Example 1

3.9 Kg of an all Arabica coffee French roasted and ground is blended with 2.57 Kg of a French roasted and ground Arabica/Robusta blend. This coffee is loaded into an extraction column about 6 inches in diameter and four and a half feet tall. The cap, which includes an exit port with a screen to contain the R&G coffee, is placed on the column. Nitrogen gas is used to flush air from the extraction system. Deaerated distilled water heated to 82° C. is pumped counter-currently through the bed of coffee at about 1.9 liter/minute. 45.2 Kg of extract containing 3.89% solids is obtained and cooled to about 29° C. This extract is filtered through a 10 micron pleated glass filter cartridge to remove sediment and then heat treated for an equivalent time of 21.2 seconds at an equivalent temperature of 145° C. using a MicroThermics model 25DH UHT/HTST unit to produce a concentrate.

Pre-thermal treatment and post thermal treatment samples of the concentrate are tested according to Applicants' analytical methods. The pre-thermal treatment sample is found to have a pyridine to 5-methyl-2-furfurylfuran ratio value of 9.4, and the samples are found to have ratio values of furfuryl acetate to 4-ethyl guaiacol listed below.

| Sample | Furfuryl Acetate:4-Ethyl Guaiacol Ratio Value |
| --- | --- |
| Fresh Brewed Standard | 0.62 |
| Pre-thermal treatment sample | 1.75 |
| Post thermal treatment sample | 0.60 |

Example 2

3.6 Kg of an all Arabica roasted and ground coffee having roast color of 15.5 L is extracted as in Example 1 at a flow rate of about 1.8 liters/minute, yielding 26 Kg of concentrate containing 3.59% solids. The extract is heat treated for an equivalent time of 26.5 seconds at an equivalent temperature of 141° C. using a MicroThermics model 25DH UHT/HTST unit to produce a concentrate.

Pre-thermal treatment and post thermal treatment samples of the concentrate are tested according to Applicants' analytical methods. The pre-thermal treatment sample is found to have a pyridine to 5-Methyl-2-Furfurylfuran ratio value of 10.2, and the samples are found to have ratio values of furfuryl acetate to 4-ethyl guaiacol listed below.

| Sample | Furfuryl Acetate:4-Ethyl Guaiacol Ratio Value |
| --- | --- |
| Fresh Brewed Standard | 0.83 |
| Pre-thermal treatment sample | 3.06 |
| Post thermal treatment sample | 1.44 |

Example 3

6.64 Kg of a roasted and ground decaffeinated Arabica and Robusta coffee blend having roast color of 18.1 L is extracted as in Example 1 at a flow rate of about 1.8 liters/minute, yielding 44.4 Kg of extract containing 3.56% solids. The extract is heat treated for an equivalent time of 25.6 seconds at an equivalent temperature of 141° C. using a MicroThermics model 25DH UHT/HTST unit to produce a concentrate.

Pre-thermal treatment and post thermal treatment samples of the concentrate are tested according to Applicants' analytical methods. The pre-thermal treatment sample is found to have a pyridine to 5-Methyl-2-Furfurylfuran ratio value of 12.7, and the samples are found to have ratio values of furfuryl acetate to 4-ethyl guaiacol listed below.

| Sample | Furfuryl Acetate:4-Ethyl Guaiacol Ratio Value |
|---|---|
| Fresh Brewed Standard | 0.47 |
| Pre-thermal treatment sample | 1.12 |
| Post thermal treatment sample | 0.42 |

What is claimed:

1. A process for improving a coffee concentrate, the process comprising the steps of:
   (a) providing a liquid coffee concentrate comprising a liquid prepared from a roast and ground coffee,
      wherein the liquid coffee concentrate has a furfuryl acetate to 4-ethyl guaiacol ratio ranging from about 238% to about 369% of the furfuryl acetate to 4-ethyl guaiacol ratio of a fresh brewed coffee prepared from the same roast and ground coffee used to prepare the liquid coffee concentrate; and
   (b) subjecting the liquid coffee concentrate to heat treating for an equivalent time of from about 15 seconds to about 35 seconds at an equivalent temperature of from about 115° C. to about 149° C. to improve the liquid coffee concentrate by reducing the furfuryl acetate to 4-ethyl guaiacol ratio of the liquid coffee concentrate,
      wherein the improved liquid coffee concentrate has a furfuryl acetate to 4-ethyl guaiacol ratio of from about 50% to about 210% of the furfuryl acetate to 4-ethyl guaiacol ratio of a fresh brewed coffee prepared from the same roast and ground coffee used to prepare the liquid coffee concentrate of step (a).

2. The process of claim 1 wherein the improved liquid coffee concentrate has a furfuryl acetate to 4-ethyl guaiacol ratio of from about 65% to about 150% of the furfuryl acetate to 4-ethyl guaiacol ratio of a fresh brewed coffee prepared from the same roast and ground coffee used to prepare the liquid coffee concentrate of step (a).

3. The process of claim 1 wherein the improved liquid coffee concentrate has a furfuryl acetate to 4-ethyl guaiacol ratio of from about 80% to about 120% of the furfuryl acetate to 4-ethyl guaiacol ratio of a fresh brewed coffee prepared from the same roast and ground coffee used to prepare the liquid coffee concentrate of step (a).

4. The process of any one of claims 1-3 wherein step (b) involves subjecting the liquid coffee concentrate to heat treating for an equivalent time of from about 16.5 seconds to about 30 seconds at an equivalent temperature of from about 126° C. to about 149° C.

5. The process of claim 4 wherein step (b) involves subjecting the liquid coffee concentrate to heat treating for an equivalent time of from about 18 seconds to about 28 seconds at an equivalent temperature of from about 137° C. to about 149° C.

6. The process of any one of claims 1-3 wherein the liquid coffee concentrate of step (a) is a non hydrolyzed liquid.

7. The process of claim 4 wherein the liquid coffee concentrate of step (a) is a non hydrolyzed liquid.

8. The process of claim 5 wherein the liquid coffee concentrate of step (a) is a non hydrolyzed liquid.

9. The process of claim 1 wherein the liquid coffee concentrate of step (a) has a pyridine to 5-methyl-2-furfurylfuran ratio of from about 3:1 to about 25:1.

10. The process of claim 9 wherein the liquid coffee concentrate of step (a) has a pyridine to 5-methyl-2-furfurylfuran ratio of from about 4:1 to about 20:1.

11. The process of claim 10 wherein the liquid coffee concentrate of step (a) has a pyridine to 5-methyl-2-furfurylfuran ratio of from about 4.5:1 to about 15:1.

12. The process of claim 1 wherein the liquid coffee concentrate of step (a) has a solids content of from about 2.3% to about 25% by weight.

13. The process of claim 12 wherein the liquid coffee concentrate of step (a) has a solids content of from about 3.5% to about 10% by weight.

14. The process of claim 13 wherein the liquid coffee concentrate of step (a) has a solids content of from about 3.5% to about 8% by weight.

15. The process of any one of claims 9-14 wherein the liquid coffee concentrate of step (a) is a non hydrolyzed liquid.

16. The process of claim 4 wherein the liquid coffee concentrate of step (a) has a pyridine to 5-methyl-2-furfurylfuran ratio of from about 3:1 to about 25:1.

17. The process of claim 16 wherein the liquid coffee concentrate of step (a) has a pyridine to 5-methyl-2-furfurylfuran ratio of from about 4:1 to about 20:1.

18. The process of claim 17 wherein the liquid coffee concentrate of step (a) has a pyridine to 5-methyl-2-furfurylfuran ratio of from about 4.5:1 to about 15:1.

19. The process of claim 4 wherein the liquid coffee concentrate of step (a) has a solids content of from about 2.3% to about 25% by weight.

20. The process of claim 19 wherein the liquid coffee concentrate of step (a) has a solids content of from about 3.5% to about 10% by weight.

21. The process of claim 20 wherein the liquid coffee concentrate of step (a) has a solids content of from about 3.5% to about 8% by weight.

22. The process of any one of claims 16-21 wherein the liquid coffee concentrate of step (a) is a non hydrolyzed liquid.

23. A process for improving a coffee concentrate, the process comprising the steps of:
   a. producing a liquid coffee concentrate from a roast and ground coffee by an extraction performed at:
      i. a flow rate ratio of kilograms water per minute to kilograms of roast and ground coffee of from about 0.1:1 to about 0.5:1;
      ii. a water front speed of from about 5 cm to about 25 cm per minute;
      iii. a draw-off ratio of mass of liquid coffee concentrate to mass of roast and ground coffee of from about 4:1 to about 10:1; and
      iv. a yield of from about 17% to about 35%
      wherein the liquid coffee concentrate has a furfuryl acetate to 4-ethyl guaiacol ratio ranging from about 238% to about 369% of the furfuryl acetate to 4-ethyl guaiacol ratio of a fresh brewed coffee prepared from the same roast and ground coffee used to produce the liquid coffee concentrate; and b. subjecting the liquid coffee concentrate to heat treating for an equivalent time of from about 15 seconds to about 35 seconds at an equivalent temperature of from about 115° C. to about 149° C. to improve the liquid coffee concentrate by reducing the furfuryl acetate to 4-ethyl guaiacol ratio of the liquid coffee concentrate, wherein the improved liquid coffee concentrate has a furfuryl acetate to 4-ethyl guaiacol ratio of from about 50% to about 210% of the furfuryl acetate to 4-ethyl guaiacol ratio of a fresh brewed coffee prepared from the same roast and ground coffee used to prepare the liquid coffee concentrate of step (a).

24. The process of claim 23 wherein the extraction is performed at less than 149° C.

25. The process of claim 24 wherein the extraction is performed at a temperature of from about 65° C. to about 99° C.

26. The process of claim 25 wherein the extraction is performed at a temperature of from about 82° C. to about 93° C.

27. The process of claim 23 wherein the extraction is performed at
a. a draw-off ratio of mass of liquid coffee concentrate to mass of roast and ground coffee of from about 5.5:1 to about 8:1, and
b. a yield of from about 17% to about 30%.

28. The process of claim 23 wherein the extraction is performed at
a. a draw-off ratio of mass of liquid coffee concentrate to mass of roast and ground coffee of from about 6.5:1 to about 7:1, and
b. a yield of from about 23% to about 27.5%.

* * * * *